United States Patent [19]

Bonuchi et al.

[11] 3,994,143
[45] Nov. 30, 1976

[54] PRODUCT CHILLING IN A FLUID CONVEYOR

[75] Inventors: James A. Bonuchi, Merriam, Kans.; J. D. Hawthorn, Independence, Mo.

[73] Assignee: Gordon Johnson Company, Kansas City, Mo.

[22] Filed: Dec. 2, 1974

[21] Appl. No.: 528,945

Related U.S. Application Data

[62] Division of Ser. No. 408,862, Oct. 23, 1973, Pat. No. 3,874,186.

[52] U.S. Cl. .................................. 62/317; 62/333; 62/375; 165/105; 302/14
[51] Int. Cl.² ........................................ F25D 17/04
[58] Field of Search ............... 62/63, 332, 333, 374, 62/375, 317; 165/105; 417/390, 565, 567; 302/14; 137/13

[56] References Cited

UNITED STATES PATENTS

| | | | |
|---|---|---|---|
| 862,867 | 8/1907 | Eggleston | 417/390 |
| 3,488,973 | 1/1970 | Harben, Jr. | 62/63 |
| 3,519,006 | 7/1970 | Simon et al. | 137/13 |
| 3,555,838 | 1/1971 | Morris, Jr. | 62/63 |
| 3,603,379 | 9/1971 | Leonard, Jr. | 165/105 |
| 3,623,331 | 11/1971 | Buyens | 62/63 |

Primary Examiner—William E. Wayner
Assistant Examiner—Ronald C. Capossela
Attorney, Agent, or Firm—Schmidt, Johnson, Hovey & Williams

[57] ABSTRACT

A chilling system advances products through a conveying tube and simultaneously chills the products using the fluid-conveying medium itself. Conveyance is effected through hydraulic pressure without the application of direct mechanical forces to the products whereby to minimize the instances of damage thereto, and product advancement is carried out on a continuous, first-in, first-out basis with a uniform, readily predictable rate of discharge. One embodiment passes the conveying tube through a chilling tank containing a coolant within which the tube is immersed; another embodiment employs a plurality of separate conveying tubes passing through a common chilling tank to prevent comingling of different product types that may be advanced through the respective tubes; and a further embodiment precools the conveying fluid before its introduction to the conveying tube with the products so that the products are chilled without the necessity of passing the conveying tube through a chilling tank, the option being provided to convey the products with a slurry of ice and liquid.

10 Claims, 4 Drawing Figures

PRODUCT CHILLING IN A FLUID CONVEYOR

This is a division of application Ser. No. 408,862 filed on Oct. 23, 1973 now U.S. Pat. No. 3,874,186.

This invention relates to a revolutionary concept in the chilling of food products that are otherwise subject to rapid spoilage. The method and apparatus hereinafter described are particularly conducive to use with poultry products such as giblets, including the neck, gizzard, heart and liver, but it will be clear that the principles of this invention may be applied to a vast assortment of product types requiring rapid chilling. Therefore, it is to be understood that while the concepts of this invention are often described in terms of poultry products of the aforementioned character, such is done by way of illustration only and should not be considered limiting to the scope of this invention.

In the processing of poultry products such as giblets, it is important that after evisceration has taken place and the giblets have been properly washed, the giblets be rapidly cooled from body temperature down to approximately 40° F. before the giblets can then be wrapped and stuffed into the carcass of a similarly chilled bird. Various and sundry methods and machines have been developed and utilized over the years in an effort to carry out such chilling in a rapid, sanitary manner, but these developments have suffered from a variety of different shortcomings. For example, several prior arrangements have utilized the concept of advancing a line of products through a stationary chilling bath in order to lower the temperature of the products to the desired level. In several of these machines, product advancement through the bath was carried out solely by a swift current created in the bath rather than by physical contact between a moving mechanical device and the products. Accordingly, in the case of giblets, for example, which tended to bunch together in rather cohesive masses when introduced into the bath, there was considerable resistance to continuous advancement through the bath at a uniform rate. Instead of issuing from the bath at a steady, reliable rate, the giblets thus tended to leave in surges or bunches at sporadic intervals and created a substantial bottleneck in the otherwise streamlined processing method of the poultry products. Without the giblets being supplied at a steady predictable rate, further operations subsequent to the chilling, such as giblet wrapping and packing of the wrapped giblets into the poultry carcass, could not occur at a steady pace.

Other shortcomings with the previous bath type of chilling systems for poultry products included the difficulty in maintaining the bath equipment properly sanitized at the end of each day's production run and the tendency for the products to be "overwashed" while passing through the chilling bath. Typically, the products were washed before introducing the same to the chilling step, and therefore the prolonged exposure to the coolant, the agitation, and the scrubbing-like action often imparted to the products led to leaching or discoloring of the products. This, of course, detracted from their appearance, and lessened their sales appeal.

Further, a considerable number of moving parts were involved with previous systems, such as belts, chains, pulleys, conveyor linkages, shackles and motors, all of which were inherently susceptible to damage, wear, and malfunction requiring considerable attention from a maintenance standpoint. Substantial time and expense could be wasted in repairing and maintaining such equipment, not to mention the losses accruing as a result of the "downtime" involved.

Another consideration is the excessive amount of coolant, such as water, which was required with earlier systems. For example, where the open top vats were used and poultry giblets were being processed through the vats, a large enough volume of water was needed in the vats to completely submerege the giblets and maintain them fully covered during their entire trip through the vats. For sanitation reasons, the water in the vats had to be continuously overflowed and replensihed so that substantial extra expense was presented not only in obtaining the large supply of water, but also in equipment designed to handle the inflow and overflow of the water.

Briefly described, the present invention relates to the concept of chilling food products, such as poultry products, by pumping the same through a conveying tube having a suitable conveying medium therein and utilizing the conveying medium itself to simultaneously lower the temperature of the products during their transfer through the tube. Instead of passing the products into and through a vat having suitable coolant such as water, the products are advanced through a tube wherein chilling thereof is effected by the medium that conveys them. Instead of passing through the coolant as in previous systems, the products move with the conveying medium so that each incremental volume or mass of the products is constantly enveloped by its own pocket of medium and is exposed only to such pocket during the complete chilling process.

Pursuant to the foregoing, it is an important object of the present invention to provide a revolutionary, relatively non-complex product-chilling system which substantially eliminates the problems and disadvantages of previous systems including "bottleneck" operations, time-consuming and arduous cleanup procedures, excessive moving parts subject to maintenance and repair, damaged and destroyed products, and large volumes of coolant.

Another important object of this invention is to provide a method and apparatus for product chilling which substantially decrease the amount of floor space heretofore required with previous chilling concepts.

An additional important object of the instant invention is to provide chilling apparatus as aforesaid which is highly conducive to visual inspection thereof for sanitation purposes by virtue of its adaptability to quickly detachable couplings and the like for joining assorted components of the apparatus.

Other objects of the invention include the provision of a chilling system which is highly flexible in the sense that it can be customized to fit the floor space and layout of a particular plant; the provision of a system wherein the conveying medium may be cooled indirectly through an external body of coolant exposed to the tube through which the medium and products pass or wherein the medium may be precooled prior to introduction into the conveying tube with the products so that the tube need not be exposed to such an external source of refrigeration; the provision of a special reciprocating pump system that is operable to advance the products and conveying medium in an optimum manner without direct physical impact with the products; the provision of a chilling system wherein a number of different types of products can be chilled in a sanitary, rapid, continuous flow process without comingling of the different product types and in a minimum of floor space; and the provision of a chilling system that positively assures chilling of the products on a first-in, first-out basis.

Figure 1:
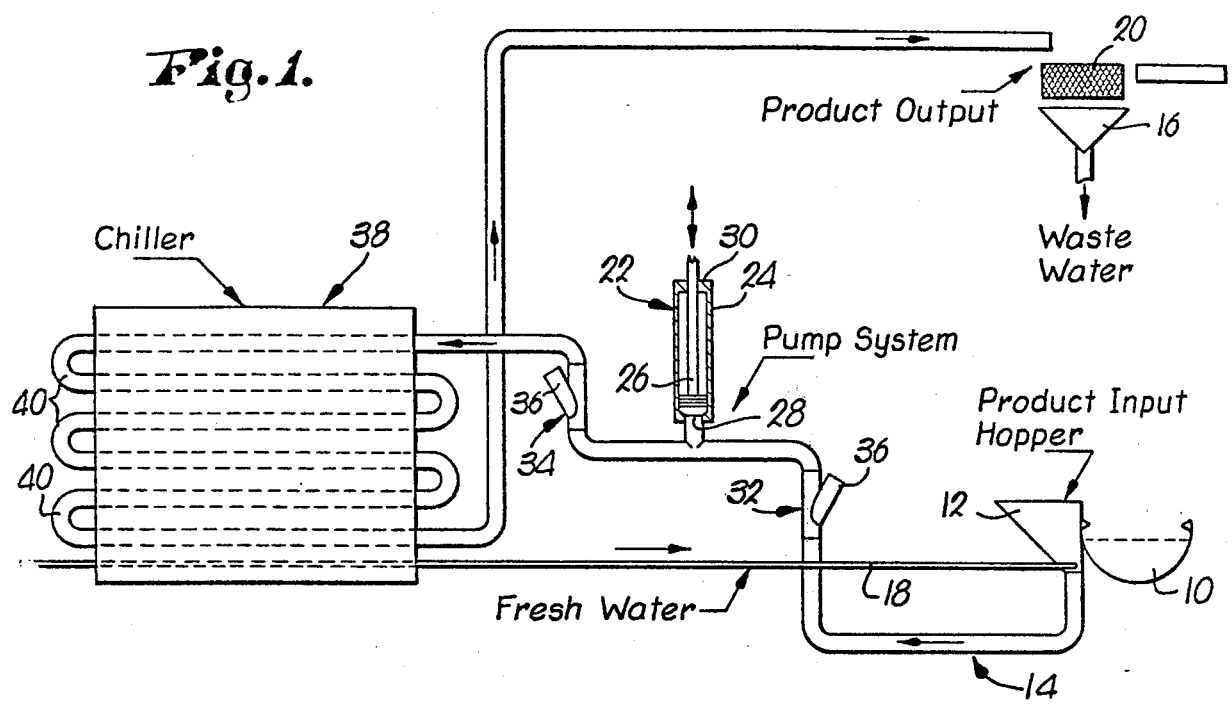
FIG. 1 is a schematic, elevational illustration of a chilling system that embodies the concepts of the present invention.

One form of the chilling system that is constructed in accordance with the principles of this invention is illustrated in FIG. 1. A worker (not shown) may be stationed adjacent a water flush trough 10 for dropping therein inedible products that may have been separated from other edible parts or products. The edible products may then be placed into the product hopper 12 which is coupled with a conveying tube 14 leading ultimately to an output receiver 16. A supply line 18, preferably but not necessarily carrying fresh water, leads from a source of supply to the hopper 12 for introduction into tube 14 along with the products at substantially the same point. If desired, a suitable screen member 20 or the like may be utilized at the output end of tube 14 to separate the products emanating from tube 14 from the conveying medium.

Between the input and output ends of tube 14 is disposed a special pump system 22 that is utilized to advance the products and the medium or fluid simultaneously through tube 14. The pump system 22 includes an elongated pump cylinder 24 communicating with tube 14 and projecting laterally therefrom, and a piston 26 that reciprocates within cylinder 24 between the lower open end 28 of the latter and the upper closed end 30. Suitable operating means (not shown) may be provided for actuating the piston 26. System 22 further includes a pair of oppositely operating check valve units 32 and 34 disposed on opposite sides of pump cylinder 24 within tube 14. The check valves 32 and 34 are of the type wherein a valve ball (not shown) is movable into a laterally offset section 36 when the valve 32 or 34 is open whereby to completely clear that portion of the tube 14 for product movement. Although the valves 32 and 34 are identical to one another they do, in fact, operate oppositely in response to reciprocation of the piston 26, because when the latter moves in its suction stroke toward end 30, the valve 32 opens and the valve 34 closes whereby to draw products into the region between valves 32 and 34. On the other hand, when piston 26 moves in its compression stroke toward end 28, valve 32 closes and valve 34 opens so that the products within he region between valves 32 and 34 are forced outwardly from such region beyond valve 34.

A chilling tank 38 or other suitable heat exchanger is coupled with the tube 14 between the input and output ends thereof for exposing the tube 14 to coolant in order to lower the temperature of the conveying fluid within tube 14 which, in turn, chills the products. By virture of the continuous operation of the pump system 22, the products are continuously moving through tube 14 except during the short interval that piston 26 is completing its suction stroke so that it may be necessary to provide tube 14 with a number of coils 40 in order to provide sufficient retention time in chilling tank 38 to lower the products to the desired temperature.

Figure 3:
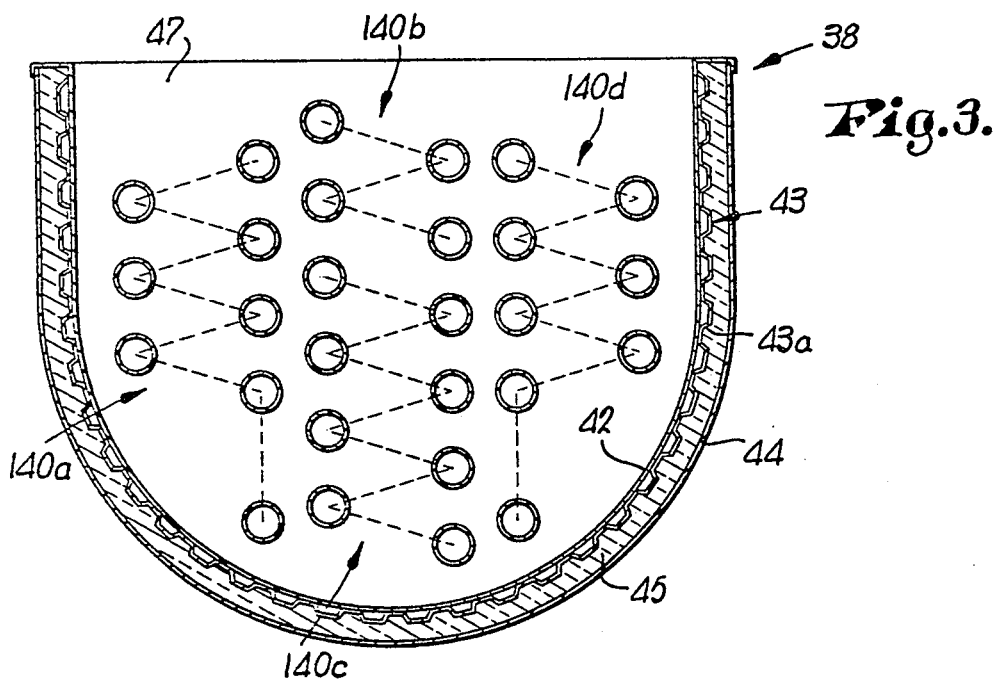
FIG. 3 is an enlarged, schematic, vertical cross-sectional view of a chilling tank constructed in accordance with the teachings of the present invention.

As illustrated in FIG. 3, the tank 38 may be of relatively simple construction in the nature of transversely U-shaped, open top vat having an inner wall 42, a dimple sheet 43 held in spaced relationship to wall 42 by dimples 43a, an outer jacket 44 separated from sheet 43 by insulation 45, and a pair of opposed end walls 47 (only one end wall 47 being illustrated). With this construction, the tank 38 is suited for carrying water as the coolant for coils 40, and refrigerant, such as freon or ammonia, may be passed through the passages surrounding dimples 43a to lower the temperature of the water. As an alternative, tank 38 may be constructed in single-wall fashion, whereupon ice chunks are added to the water to reduce its temperature. In certain situations the former arrangement is to be preferred, while in others, the simple expedient of adding ice to the body of the coolant within tank 38 is more desirable.

Figure 2:
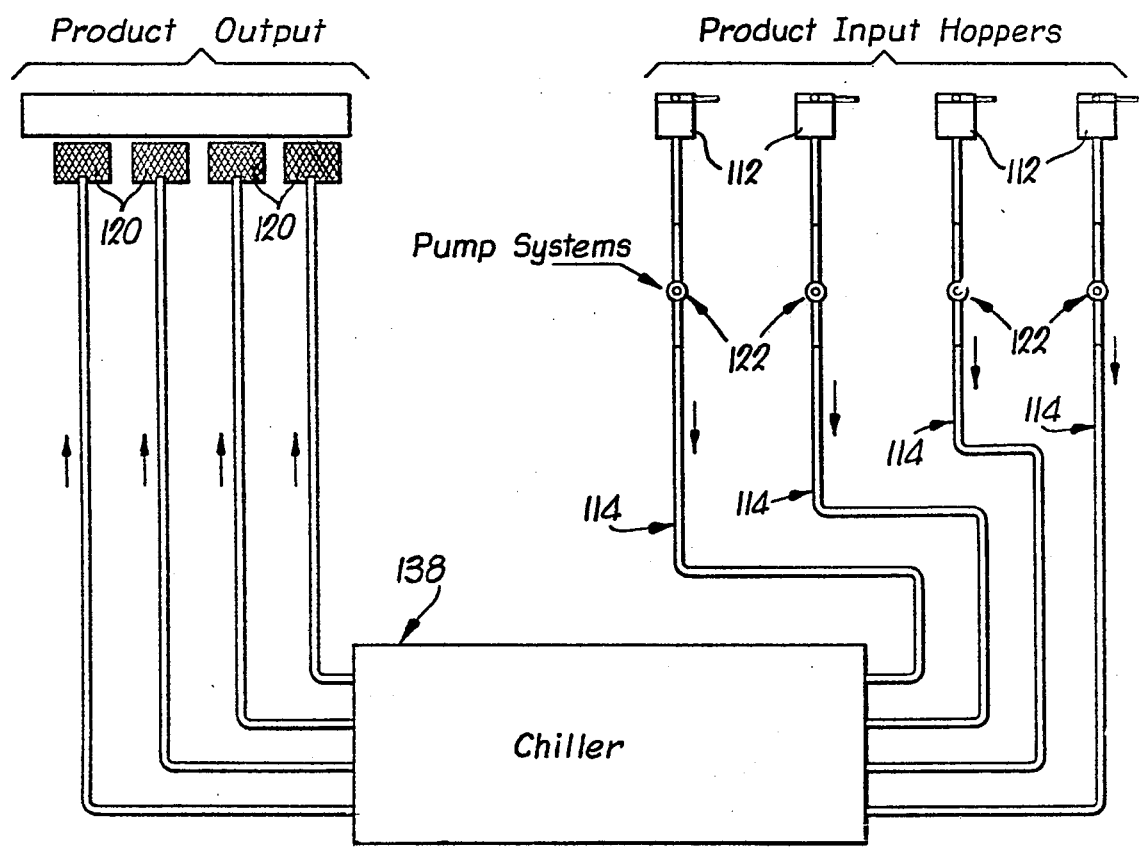
FIG. 2 is a schematic plan illustration of a chilling system wherein multiple product types are chilled without comingling thereof.

Although FIG. 3 illustrates an arrangement of coils which is utilized with the special system of FIG. 2 that is yet to be described, it is important to note in FIG. 3 that the coils within tank 38 are located fully within the confines of the latter so as to be completely immersed within the coolant when such is added. The entire surface areas of the coils are thus exposed to the coolant, and yet the interiors of the coils remain totally isolated from the coolant. Thus, the products within the coils are similarly isolated, obtaining their refrigeration indirectly from the coolant through the walls of the coils and the conveying medium therewithin, rather than directly from the coolant itself.

By virtue of the arrangement illustrated in FIG. 1, when the pump system 22 is actuated the products are then advanced through tube 14 on a first-in, first-out basis with each individual product or incremental group thereof being enveloped by its own pocket of conveying fluid. There is very little, if any, displacement of the fluid relative to the products, the products actually moving with, rather than through, the conveying fluid. Thus, if the products are poultry carcasses, for example, each individual carcass is exposed only to its own pocket of fluid and its own juices, not to those associated with any of the other carcasses. Those carcasses entering the tube 14 at the inlet end thereof are always supplied with fresh fluid from line 18, and such fluid accompanies the carcasses throughout their travel through line 14 without exposure to the fluid that has accompanied previous carcasses.

As the products pass through the coils 40 within tank 38 the conveying fluid moving through coils 40 is cooled by conduction because of the exposure of the coils 40 to the coolant within tank 38. The coolant cools the coils 40 which, in turn, absorb heat from the conveying fluid and from the products moving therewith to thereby lower the temperature of such products. In this manner, the products are chilled without any direct exposure to the coolant within tank 38; thus the coolant need not be continuously replenished, but can remain without change throughout a day's operation.

It is to be noted that the nature of the chilling system, as illustrated in FIG. 1, with its majority of components being basically tubular, gives rise to the maintenance of excellent sanitation procedures and techniques. The smooth tubular walls of tube 14, including those of its coil 40, make cleaning thereof extremely rapid, with little effort required inasmuch as the tube 14 can be simply flushed with an appropriate cleansing and disinfecting solution to remove any and all particles and bacteria that may be within tube 14. At each change in direction of the tube 14 appropriate, manually operable, quick-release fittings may be utilized that clamp the tube sections in place, thus permitting these sections of tube 14 to be removed without the use of tools in order to facilitate cleaning and visual inspection. Such removed sections need only be quickly replaced following inspection, whereupon the system is again in condition for operation.

This rapid sanitizing and inspecting procedure is in distinct contrast to that required in prior chilling systems wherein difficulty was encountered in properly cleaning the chilling tank with its associated mechanical elevators and conveyors. By virtue of the present chilling system, therefore, a substantially increased amount of time can be devoted over the long run to the actual production of chilled products as distinguished from wasting such time as downtime.

The use of a reciprocating piston type pump in lieu of a rotary pump or a diaphragm pump is significant in that by virtue of such an arrangement, a substantially less amount of conveying fluid is required to properly advance the products through tube 14. It was found that in order to move the same mass of products, such as poultry giblets, with rotary or diaphragm pumps, a significantly greater amount of fluid was necessary than is required with a reciprocating piston pump such as used in pump system 22. Accordingly, the refrigeration characteristics of the chilling system are greatly improved because there is less conveying fluid per product that must be cooled before the product itself can be chilled. This means that the retention time of the products within chilling tanks 38 can be reduced, thus decreasing the necessary size of tank 38 and making more floor space available to other processing functions.

An additional advantage to the reciprocable piston type of pump system 22 is that the damage to the products themselves is significantly reduced over that encountered with other pumping arrangements, particularly those employing rotary pumps. In the latter pumping arrangement, the products passed through the rotor of the pump, requiring the same to have flexible vanes in order to avoid battering the products and severely damaging the same. Even with such flexible vanes, however, significant damage to the products could occur, thus lowering their sales appeal. In pumping system 22, however, the piston 26 is disposed to one side of the path of advancement of the products through tube 14, and the products need not pass through piston 26, thus avoiding any damage to the products.

In fact, throughout the entire chilling system of the present invention, there is no application of direct mechanical force to the products to advance the same. Instead of impacting the products with structures such as paddles, elevators, and rotating drums and the like, the products are simply gently, although forcefully, moved along by the conveying fluid within their protective confines of the tube 14. Even during the actual chilling step when the products pass through coils 40 within tank 38, no mechanical bruising action is imparted thereto.

The chilling system illustrated in FIG. 2 is especially adapted for the chilling of poultry giblets normally consisting of livers, gizzards, hearts and necks. The basic chilling principles of this system are the same as those discussed with regard to the system of FIG. 1, but the important distinction with the system of FIG. 2 is that it allows the four types of giblets to remain totally separate from one another without comingling thereof during the chilling process. Such separation is desirable inasmuch as the giblet package, which is inserted into the chilled carcass of a bird, should contain only one each of the four types of giblets rather than a random assortment thereof. If the giblets are allowed to mix with one another during chilling, an additional processing step of separating the giblets from one another after chilling is required, and such is highly undesirable from an economic standpoint.

Thus, the system of FIG. 2 employs four separate input hoppers 112, four separate conveying tubes 114, four separate pumping systems 122, four separate output screen members 120, and a single chilling tank 138 common to all four of the conveying tubes 114. Because each type of giblet moving through its corresponding conveying tube 114 is maintained positively isolated from the giblets of the other tubes 114, all of the giblets can be cooled in a common tank 138 rather than requiring four separate chilling tanks. Manifestly, considerable expense, both in terms of actual purchased components and available floor space, is thereby avoided with the system illustrated in FIG. 2, in contrast to the prior vat systems wherein it was necessary to employ four different vats if separation of the four types of giblets was to be maintained.

FIG. 3 illustrates one manner in which a single chilling tank may be employed to handle all four types of giblets 114, such as in the FIG. 2 procedure. Although the tank illustrated in FIG. 3 is designated by the numeral 38, which numeral was utilized to designate the chilling tank used in the system of FIG. 1, it is to be understood that the system of FIGS. 1 and 2 employ chilling tanks of substantially the same construction and manner of operation. When the system of FIG. 1 is utilized, coils 40 (illustrated only in FIG. 1) are used, but when the system of FIG. 2 is employed, four different sets of coils 140a, 140b, 140c and 140d are utilized to carry the livers, hearts, gizzards and necks respectively. With this arrangement, it has been found that coils 140 should be three inches in diameter and approximately ten feet in length in order to properly chill the giblets. In the case of coils 140a, 140c and 140d, eight separate tube sections are required, while in the case of coils 140b, which carry the smaller hearts, only four separate tube sections are required.

Preferably, the tubes 114 and their coils 140a, 140b, 140c and 140d are constructed of stainless steel which has thermodynamic properties well-suited for this type of use. Water has been quite successfully used as the conveying fluid, and preferably its temperature is approximately 35° F. when introduced into the hoppers 112 at a rate of about 3 gallons per minute for each hopper 112. The giblets spend approximately ten minutes passing through coils 140a, 140b, 140c and 140d, and such retention time lowers their temperature from approximately 85° or 90° F. to approximately 40° F.

The benefits derived from the system of FIG. 2 are precisely the same as those available form FIG. 1, with the additional result that comingling of the various giblet types is avoided.

As in the FIG. 1 system, the shortcomings of previous arrangements are overcome because chilling of the giblets is rapidly and efficiently carried out without exposure of the incoming giblets to the conveying fluid of previous giblets. Moreover, the advancement of the giblets through the chilling tank 38 is an essentially continuous procedure with a highly predictable output rate so that subsequent processing operations can run smoothly and efficiently.

Figure 4:
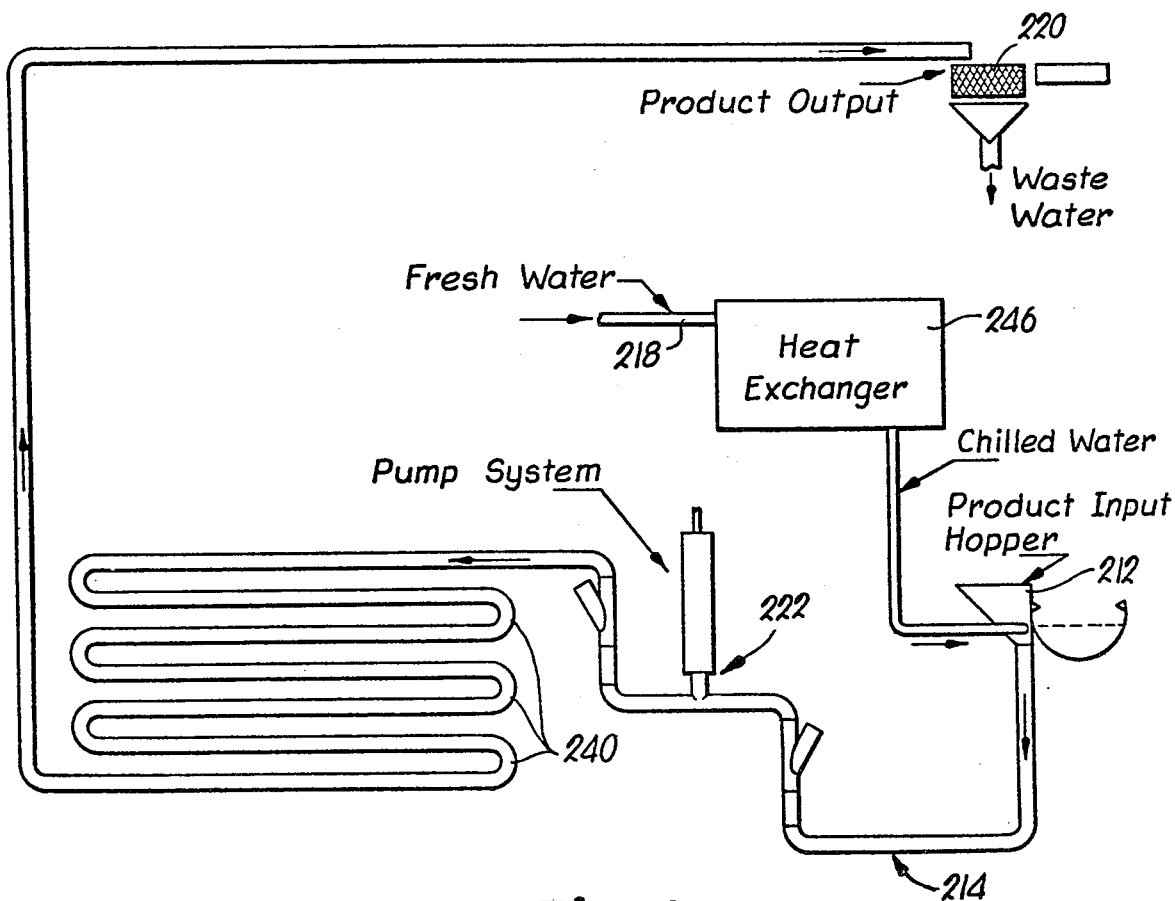
FIG. 4 is a schematic, elevational illustration of a chilling system wherein the conveying medium is precooled by a heat exchanger prior to introduction into the conveying tube.

The chilling system of FIG. 4 relates to an arrangement for precooling the conveying medium to such an extent that the need for passing the products through a chilling tank such as required in the arrangements of FIGS. 1 and 2 may be eliminated. A step in this direction is illustrated in FIG. 1 wherein the water supply line 18 passes through the chilling tank 38. Thus, the fresh water in line 18 can be initially cooled to 40° F. or even lower before entering tube 14 in order to reduce the retention time of the products within chilling tank 38. This can also be used in the FIG. 2 system.

However, the arrangement of FIG. 4 goes beyond the step of partially reducing the temperature of the fresh conveying fluid prior to introducing the same into the conveying system and, instead, contemplates completely reducing the temperature of the fluid to its lowest level first by passing the conveying fluid supply line 218 through a heat exchanger 246. The chilled fluid is then introduced into the input hopper 212 along with the products to be chilled, whereupon the products and chilled conveying fluid move through a continuous tube 214, powered by pump system 222, without a chilling tank. The coils 240 in tube 214 are utilized only to retain the products in contact with the chilled conveying fluid a sufficient amount of time to reduce the temperature of the warm products to the desired level. Thus, by the time the products issue from the outlet end of tube 214 into the screen member 220, they have been chilled by the precooled conveying fluid without passing such products through a chilling tank.

The precise lengths of the coils 240 and thus the retention time of the products within tube 214 depend upon the thermodynamic properties of the products being chilled and the temperature to which they are to be lowered. In some instances, such as where water is utilized to convey the products, it may be desirable to introduce finely cracked or flaked ice into the hopper 212 along with the cold water to produce a cold slurry as the conveying and chilling medium. The presence of the ice chips in direct contact with the products moving through tube 214 is especially beneficial because of the increased amount of heat which ice at 32° F. is able to absorb as compared to water at 33° F. Although no specific means has been illustrated for introducing the ice chips into hopper 212, it is to be understood that such introduction may be manually carried out or, in order to more accurately control the addition of such ice, the ice may be supplied thereto through an auger tube or the like.

It is to be pointed out that, while the arrangement illustrated in FIG. 4 does not have lower refrigeration requirements than those of FIGS. 1 and 2, since the conveying fluid must still be cooled and the same amount of work is required to effect such cooling whether before or after mixing the fluid with the products, the FIG. 4 arrangement does decrease the amount of floor space required because of the reduced amount of retention time of the products being chilled. Inasmuch as chilling of the products is instituted immediately upon introducing the same into hopper 212, the total length of tube 214 can be substantially less than the lengths of tubes 14 and 114 of FIGS. 1 and 2. In a high volume production facility such as a poultry processing plant, floor space is at a premium and thus the system of FIG. 4 is highly attractive.

From the preceding description, it should be apparent that all three of the chilling systems contemplated by the present invention provide vast improvements over previous systems. The numerous shortcomings of such earlier systems are completely avoided in the chilling concept of the present invention, and a major breakthrough in the chilling of perishable products, such as poultry and poultry parts, has been provided.

Having thus described the invention, what is claimed as new and desired to be secured by Letters Patent is:

1. The combination of:
    a conveying tube having an inlet at one end and an outlet at the opposite end thereof;
    a mixture of solid food products and fluid medium within said tube;
    means for continuously introducing fresh medium into said tube adjacent said inlet thereof for association with the products until said outlet is reached;
    a pump coupled with said tube for advanciang the products and said medium simultaneously through the tube from said inlet to said outlet on a first-in, first-out basis;
    means associated with said outlet for separating the products from the medium and preventing the separated medium from re-entering the tube; and
    means for cooling said medium whereby to effect chilling of the products as the latter are pumped through said tube,
    said pump including an elongated pump cylinder coupled in flow communication with said tube, a piston reciprocable within said cylinder longitudinally thereof for applying successive compression and suction forces to the products and medium within the tube, and a pair of oppositely operating check valves located on opposite sides of said pump within said tube for opening and closing said tube in response to reciprocation of said piston to cause pumping of the products and medium.

2. The combination as claimed in claim 1, wherein said means for cooling the medium includes a body of coolant through which the tube is passed.

3. The combination as claimed in claim 2, wherein said means for introducing fluid into the tube includes a supply line for the fluid coupled with said tube, said line being passed through said coolant body upstream from the tube whereby to precool the fluid before exposing the same to the products.

4. The combination as claimed in claim 2, wherein said coolant body is contained within a vat, said tube being provided with a series of coils within said vat for chilling the products carried within said tube.

5. The combination as claimed in claim 2, wherein said coolant body is contained within a vat, said vat being provided with means for circulating a refrigerant in heat transfer relationship with said coolant for chilling the latter.

6. The combination as claimed in claim 2, wherein said coolant body is provided with ice to reduce the temperature thereof.

7. The combination as claimed in claim 1, wherein is provided a plurality of said tubes, one for each type of product being chilled, said means for cooling said fluid including a common body of coolant through which all tubes are passed without comingling of the various product types.

8. The combination as claimed in claim 7, wherein said coolant is contained within a vat, each of said tubes having a series of coils within said vat for chilling the products carried within said tube to a predetermined temperature.

9. The combination as claimed in claim 1, wherein said means for introducing fluid into the tube includes a supply line for the fluid, and wherein is provided means upstream from said tube for precooling said fluid prior to introducing the same into the tube.

10. The combination as claimed in claim 9, wherein said fluid comprises a slurry of water and ice.

* * * * *